(12) United States Patent
Partis et al.

(10) Patent No.: US 8,837,823 B2
(45) Date of Patent: Sep. 16, 2014

(54) FOREGROUND BACKGROUND SEPARATION IN A SCENE WITH UNSTABLE TEXTURES

(75) Inventors: Ashley Partis, Camperdown (AU); Amit Kumar Gupta, Liberty Grove (AU); Peter Jan Pakulski, Marsfield (AU); Qianlu Lin, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 13/281,113

(22) Filed: Oct. 25, 2011

(65) Prior Publication Data

US 2012/0106837 A1 May 3, 2012

(30) Foreign Application Priority Data

Oct. 29, 2010 (AU) ................................. 2010241260

(51) Int. Cl.
*G06K 9/00* (2006.01)
*G06K 9/32* (2006.01)
*G06T 7/00* (2006.01)

(52) U.S. Cl.
CPC ..... *G06K 9/3241* (2013.01); *G06T 2207/20144* (2013.01); *G06T 7/0081* (2013.01)
USPC ........................................................ 382/165

(58) Field of Classification Search
None
See application file for complete search history.

(56) References Cited

U.S. PATENT DOCUMENTS

| | | | |
|---|---|---|---|
| 7,418,134 B2 | 8/2008 | Schwartz et al. | |
| 2005/0169367 A1* | 8/2005 | Venetianer et al. | 375/240.01 |
| 2006/0171594 A1* | 8/2006 | Avidan et al. | 382/224 |
| 2007/0036432 A1* | 2/2007 | Xu et al. | 382/173 |
| 2007/0127817 A1 | 6/2007 | Yokoi | |
| 2007/0183662 A1* | 8/2007 | Wang et al. | 382/173 |
| 2007/0273765 A1 | 11/2007 | Wang et al. | |
| 2008/0130952 A1* | 6/2008 | Mittal et al. | 382/103 |
| 2009/0290795 A1* | 11/2009 | Criminisi et al. | 382/173 |
| 2010/0232648 A1* | 9/2010 | Nishino | 382/103 |
| 2011/0044537 A1* | 2/2011 | Cobb et al. | 382/165 |
| 2011/0052000 A1* | 3/2011 | Cobb et al. | 382/103 |
| 2011/0116682 A1* | 5/2011 | Wang et al. | 382/103 |
| 2012/0154580 A1* | 6/2012 | Huang et al. | 348/143 |

OTHER PUBLICATIONS

Mahadevan et al; Spatiotemporal Saliency in Dynamic Scenes; IEEE Transactions on Pattern Analysis and Machine Intelligence; vol. 32, No. 1, Jan. 2010.

* cited by examiner

*Primary Examiner* — Jingge Wu
(74) *Attorney, Agent, or Firm* — Canon U.S.A., Inc. IP Division

(57) ABSTRACT

Disclosed herein are a system and method for performing foreground/background separation on an input image. The method pre-classifies (1010, 1020) an input visual element in the input image as one of a first element type and a second element type, dependent upon a predetermined characteristic. The method performs a first foreground/background separation (1030) on the input visual element that has been pre-classified as the first element type, wherein the first foreground/background separation step is based on color data and brightness data of the input visual element. The method performs a second foreground/background separation (1040) on the input visual element that has been pre-classified as the second element type, wherein the second foreground/background separation step is based on color data, brightness data, and texture of the input visual element.

17 Claims, 12 Drawing Sheets ns in scenes that contain background that has a
FOREGROUND BACKGROUND SEPARATION IN A SCENE WITH UNSTABLE TEXTURES

REFERENCE TO RELATED PATENT APPLICATION

This application claims the benefit under 35 U.S.C. §119 of the filing date of Australian Patent Application No. 2010241260, filed Oct. 29, 2010, hereby incorporated by reference in its entirety as if fully set forth herein.

TECHNICAL FIELD

The present disclosure relates generally to video processing and, in particular, to the separation of foreground objects from a background in a scene with unstable textures.

BACKGROUND

Video cameras, such as Pan-Tilt-Zoom (PTZ) cameras, are omnipresent nowadays, and are often used for surveillance purposes. The cameras capture more data (video content) than human viewers can process. Automatic analysis of video content is therefore needed.

The terms foreground objects and foreground refer to transient objects that appear in a scene captured on video. Such transient objects may include, for example, moving humans. The remaining part of the scene is considered to be background, even if the remaining part includes movement, such as water ripples or grass moving in the wind.

An important step in the processing of video content is the separation of the content of video frames into foreground objects and a background scene, or background. This process is called foreground/background separation. Such separation allows for further analysis, including, for example, the detection of specific foreground objects, or the tracking of moving objects. Such further analysis may assist, for example, in a decision to send an alert to a security guard.

One approach to foreground/background separation is background subtraction. In one example, a pixel value in a background model, also known as a scene model, is compared against a current pixel value at the corresponding position in an incoming frame. If the current pixel value is similar to the background model pixel value, then the pixel is considered to belong to the background; otherwise, the pixel is considered to belong to a foreground object. A challenge for such approaches is to perform accurate foreground/background separation in scenes that contain background that has a changing appearance. A common source of change in appearance relates to unstable textures, such as shaking trees, waving bushes, and rippling water. These phenomena are also known as dynamic backgrounds.

One foreground/background separation technique uses the aggregate brightness and the weighted sum of selected coefficients from Discrete Cosine Transform (DCT) blocks for foreground/background classification. In this technique, a block is considered to be foreground, if:

the difference of the aggregate brightness between the background and the input is large enough, and/or the difference of the weighted sum of selected AC coefficients between the background and the input is large enough.

Blocks that are determined to be foreground are grouped together in a connected component step to form one or more "blobs". A blob is reclassified as a background area with unstable textures if that blob has a high ratio of: (i) foreground blocks due to the difference of the weighted sum of the selected AC coefficients, relative to (ii) foreground blocks due to the difference in the aggregate brightness. Such background area blobs are removed in a post-processing step. However, an incorrect decision will cause entire detections to be incorrectly removed, if the detected object is incorrectly identified as an area with unstable textures. Alternatively, entire detections may incorrectly be kept, if the blob is not correctly identified as background. This leads to misdetections. Furthermore, if a connected component containing a real object (e.g., a human) merges with a connected component containing unstable textures (e.g., rippling water), then the post-processing step can only make a ratio-decision affecting the entire component; the post-processing step cannot filter the part of the merged blob that is due to the unstable textures from the part that is due to foreground. This results in a lost detection, or an incorrectly sized detection.

Another method divides the image into equal-sized blocks of pixels, and within each block, clusters of homogenous pixels (pixel clusters) are modelled with Gaussian distributions. Pixel homogeneity is defined by the colour of the pixels in the cluster. Each block is associated with one or more pixel clusters. When attempting to match an input pixel at a block location to a pixel cluster, the pixel is first attempted to be matched visually to the pixel clusters that overlap with the position of the pixel. If the pixel does not visually match any of the pixel clusters that overlap with the position of the pixel, then other neighbouring pixel clusters that do not overlap with the position of the pixel within the block are used to attempt a match to the pixel. If the pixel matches a neighbouring cluster, then it is assumed that the pixel is a dynamic background detection, such as swaying trees or rippling water, and the pixel is considered to be part of the background. This technique is more computationally expensive that the DCT block-based technique described above.

Another method uses neighbourhood-matching techniques combined with the background subtraction of pixels. If an input pixel does not match the corresponding background model pixel, then a neighbourhood of pixels in the background model is searched to determine if the input pixel matches any pixel in that neighbourhood. The neighbourhood area searched is centred around the corresponding background model pixel. If the input pixel matches a background model pixel in the neighbourhood, then the pixel is assumed to be a dynamic background detection and the pixel is considered to be part of the background. Such techniques are computationally expensive, as these techniques increase the number of matches performed for each input pixel.

A method to model unstable textures attempts to model the dynamic areas by behaviour, instead of by appearance. To use such a method for background subtraction, a metric is required to test whether an incoming pixel conforms to the learned behaviour in the corresponding area of the model. This modelling of the unstable textures uses an autoregressive moving average (ARMA) model to model the scene behaviour, compiling a mathematical model of how pixel values at any point in time are affected by other pixel values across the frame. Such techniques are very computationally expensive and can only be used after a captured length of video is complete.

Thus, a need exists to provide an improved method and system for separating foreground objects from a background in a scene with unstable textures.

SUMMARY

According to a first aspect of the present disclosure, there is provided a computer-implemented method for performing foreground/background separation on an input image. The method pre-classifies an input visual element in the input image as one of a first element type and a second element type, dependent upon a predetermined characteristic. The method then performs a first foreground/background separation on the input visual element pre-classified as the first element type, wherein the first foreground/background separation step is based on colour data and brightness data of the input visual element, and performs a second foreground/background separation on the input visual element pre-classified as the second element type, wherein the second foreground/background separation step is based on colour data, brightness data, and texture of the input visual element.

According to a second aspect of the present disclosure, there is provided a computer-implemented method for detecting foreground in an input image. The method includes the steps of: pre-classifying an input visual element in the input image as one of a first element type and a second element type dependent upon a predetermined characteristic; classifying the pre-classified input visual element by applying a first classifier if the pre classified input visual element is of the first element type and applying a second classifier if the pre-classified input visual element is of the second element type; and detecting the input visual element as foreground dependent upon the classifying step.

According to a third aspect of the present disclosure, there is provided a computer readable storage medium having recorded thereon a computer program for detecting foreground in an input image. The computer program comprising code for performing the steps of: pre-classifying an input visual element in the input image as one of a first element type and a second element type dependent upon a predetermined characteristic; classifying the pre-classified input visual element by applying a first classifier if the pre classified input visual element is of the first element type and applying a second classifier if the pre-classified input visual element is of the second element type; and detecting the input visual element as foreground dependent upon the classifying step.

According to a fourth aspect of the present disclosure, there is provided an apparatus for detecting foreground in an input image. The apparatus includes a storage device for storing a computer program and a processor for executing the program. The program includes code for performing the method steps of: pre-classifying an input visual element in the input image as one of a first element type and a second element type dependent upon a predetermined characteristic; classifying the pre-classified input visual element by applying a first classifier if the pre classified input visual element is of the first element type and applying a second classifier if the pre-classified input visual element is of the second element type; and detecting the input visual element as foreground dependent upon the classifying step.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present disclosure will now be described with reference to the following drawings, in which.

DETAILED DESCRIPTION

Figure 1:
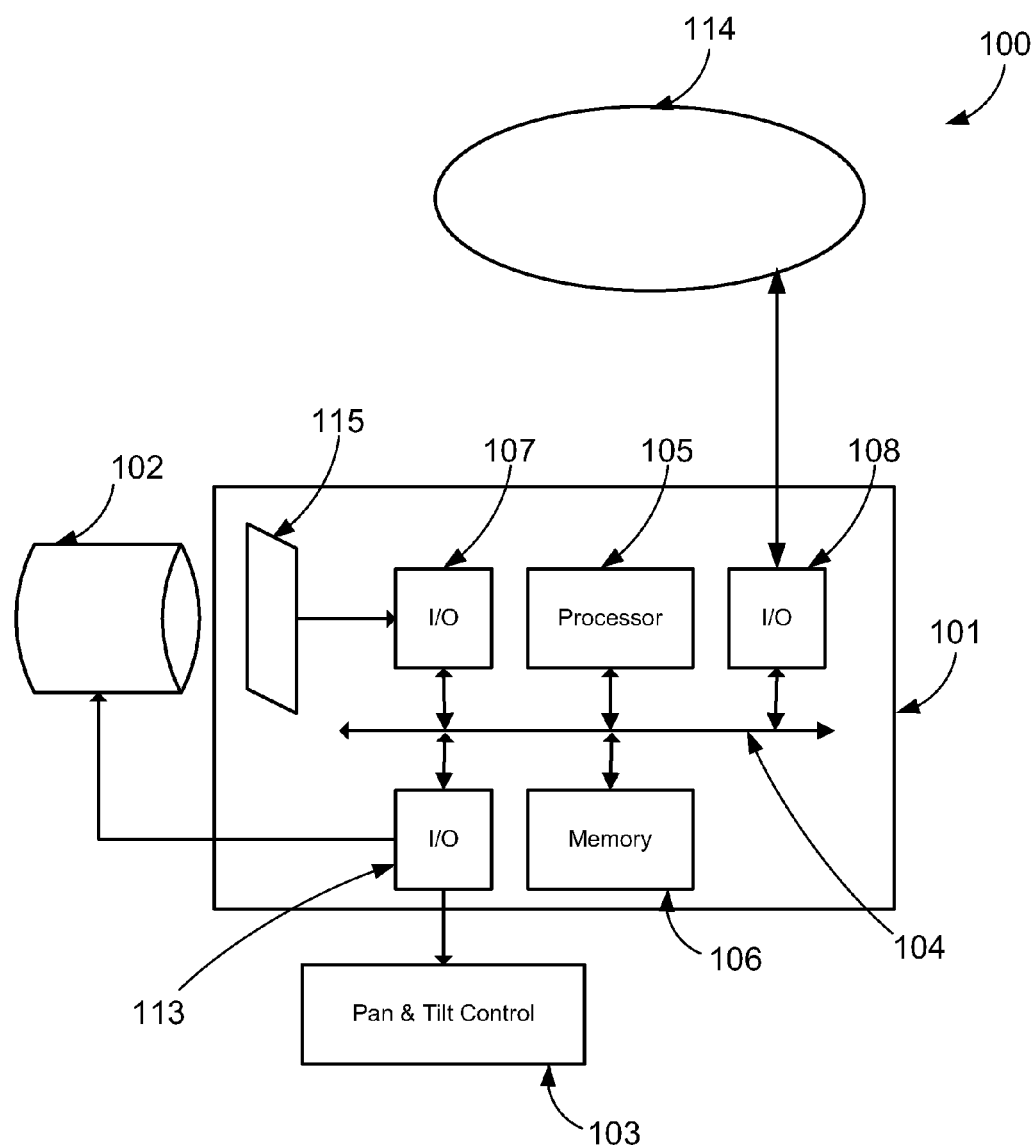
FIG. 1 is a functional schematic block diagram of a camera, upon which foreground/background separation may be performed.

Where reference is made in any one or more of the accompanying drawings to steps and/or features that have the same reference numerals, those steps and/or features have for the purposes of this description the same function(s) or operation(s), unless the contrary intention appears.

A video is a sequence of images or frames. Thus, each frame is an image in an image sequence (video sequence). Each frame of the video has an x axis and a y axis. A scene is the information contained in a frame and may include, for example, foreground objects, background objects, or a combination thereof. A scene model is stored information relating to a scene and may include foreground, background, or a combination thereof. A scene model generally relates to background information derived from an image sequence. A video may be encoded and compressed. Such encoding and compression may be performed intra-frame, such as motion-JPEG (M-JPEG), or inter-frame, such as specified in the H.264 standard. An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream. A visual element position in the frame axis is represented by x and y coordinates of the visual element under consideration.

One representation of a visual element is a pixel visual element. In one embodiment, each visual element has three (3) values describing the visual element. In one example, the three values are Red, Green and Blue colour values (RGB values). The values representing characteristics of the visual element are termed as visual element attributes. The number and type of values associated with each visual element (visual element attributes) depend on the format utilised for the apparatus implementing an embodiment of the present disclosure.

It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

Another representation of a visual element uses 8×8 DCT blocks as visual elements. The visual element attributes for an 8×8 DCT block are 64 luminance DCT coefficients, 64 chrominance red (Cr) DCT coefficients, and 64 chrominance blue (Cb) DCT coefficients of the block. The 64 luminance DCT coefficients can be further divided into 1 DC coefficient, and 63 AC coefficients. The DC coefficient is a representation of average luminance value of the visual element and the AC coefficients represent the frequency domain information of the luminance characteristics of the 8×8 block. The AC coefficients are commonly ordered from lowest-frequency to highest-frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving 196 attributes in total. Many other combinations of attributes are possible or other attributes can be generated from the above mentioned attributes using machine learning algorithms, such as linear regression techniques.

A region may be defined as one or more visual elements, at which characteristics such as texture, average colour, or average brightness may be derived from the pixel image data of the corresponding image/video frame.

In an exemplary arrangement, a visual element is an 8 by 8 block of Discrete Cosine Transform (DCT) coefficients as acquired by decoding a motion-JPEG frame. In the arrangement, blocks are non-overlapping. In another arrangement, blocks overlap. In other arrangements, a visual element is a group of pixels, such as: Red-Green-Blue (RGB) pixels; or a block of other transform coefficients such as Discrete Wavelet Transformation (DWT) coefficients as used in the JPEG-2000 standard. The colour model is typically YUV, where the Y component represents the luminance, and the U and V represent the chrominance.

It is to be noted that the described method may equally be practised using other representations of visual elements. For example, the DCT blocks can be of a different size to enable a different granularity for storing the attributes of the pixels represented by the DCT blocks. Other transforms, such as wavelet transforms, can also be used to generate representative attributes from the pixels within a scene so that a historical representation of the scene can be accumulated.

The present disclosure relates to a method and system for performing foreground/background separation in a scene with unstable textures. Embodiments of the present disclosure apply a pre-classifier to classify each region of a scene as being either an unstable texture region that contains unstable textures or a stable texture region that does not contain unstable textures. It is to be noted that a stable texture region is not restricted to a static region without movement. Rather, a stable texture region is defined by the absence of unstable textures. A stable texture region may, for example, display predictable, consistent, or repetitive movement within a predefined range. For each unstable texture region, the method applies a first type of foreground/background classifier that is optimised to operate on unstable textured visual elements. For each stable texture region, the method applies a second type of foreground/background classifier that is optimised to operate on normal, or typical, stable textured visual elements. Applying the pre-classifier facilitates a better matching of the region to a scene model to identify regions of foreground and background.

In one arrangement, the first type of foreground/background classifier utilises DC components of image data of the scene to perform foreground/background separation and the second type of foreground/background classifier utilises DC and AC components of image data of the scene.

One embodiment provides a computer-implemented method for detecting foreground in an input image that includes one or more visual elements. The method processes the visual elements to identify the visual element as foreground or background. The method pre-classifies an input visual element in the input image as one of a first element type and a second element type dependent upon a predetermined characteristic. As described above, in one arrangement a first element type is an unstable textured visual element and a second element type is a stable textured visual element. The predetermined characteristic in such an implementation is unstable texture. Thus, a visual element is pre-classified as being an unstable textured or a stable textured element.

The method then classifies the pre-classified input visual element by applying a first classifier if the pre-classified input visual element is of the first element type and applying a second classifier if the pre-classified input visual element is of the second element type. The method then detects the input visual element as foreground dependent upon the result of the classifying step. In one embodiment, the method uses a foreground/background separation method on the classified visual element to detect whether the visual element is foreground or background.

Another embodiment provides a computer-implemented method for performing foreground/background separation on an input image. The method pre-classifies an input visual element in the input image as one of a first element type and a second element type, dependent upon a predetermined characteristic. The method performs a first foreground/background separation on the input visual element that has been pre-classified as the first element type, wherein the first foreground/background separation step is based on colour data and brightness data of the input visual element. The method performs a second foreground/background separation on the input visual element that has been pre-classified as the second element type, wherein the second foreground/background separation step is based on colour data, brightness data, and texture of the input visual element.

An alternative embodiment provides a method of detecting foreground in a scene. The method identifies an unstable texture region in the scene, wherein a first characteristic of the unstable texture region satisfies a first predetermined threshold, and further wherein a second characteristic of the unstable texture region satisfies a second predetermined threshold. The method then detects foreground in the identified unstable texture region using colour data and brightness data of the identified unstable texture region, and detects foreground in a stable region using colour data, brightness data, and texture of the stable region.

FIG. 1 shows a functional schematic block diagram of a camera, upon which methods of foreground/background separation and detecting foreground in accordance with the present disclosure may be performed. The camera 100 is a pan-tilt-zoom camera (PTZ) comprising a camera module 101, a pan and tilt module 103, and a lens system 102. The camera module 101 typically includes at least one processor unit 105, a memory unit 106, a photo-sensitive sensor array 115, an input/output (I/O) interface 107 that couples to the sensor array 115, an input/output (I/O) interface 108 that couples to a communications network 114, and an interface 113 for the pan and tilt module 103 and the lens system 102. The components that include the sensor I/O interface 107, processor unit 105, network I/O interface 108, control interface 113, and memory 106 of the camera module 101 typically communicate via an interconnected bus 104 and in a manner that results in a conventional mode of operation known to those in the relevant art.

The camera 100 is used to capture video frames, also known as input images, representing the visual content of a scene appearing in the field of view of the camera 100. Each frame captured by the camera 100 comprises more than one visual element. A visual element is defined as a region in an image sample. An image sample can be a whole video frame or a portion of a video frame.

Methods of foreground/background separation and detecting foreground in an input image in accordance with the present disclosure may equally be practised on a general purpose computer. Video frames captured by a camera are processed in accordance with instructions executing on the processor of the general purpose computer to apply a pre-classification step to assist in identifying foreground and background regions of a scene. In one arrangement, a video camera is coupled to a general purpose computer for processing of the captured frames. The general purpose computer may be co-located with the camera or may be located remotely from the camera and coupled by a communications link or network, such as the Internet. In another arrangement, video frames are retrieved from storage memory and are presented to the processor for foreground/background separation.

Figure 11A:
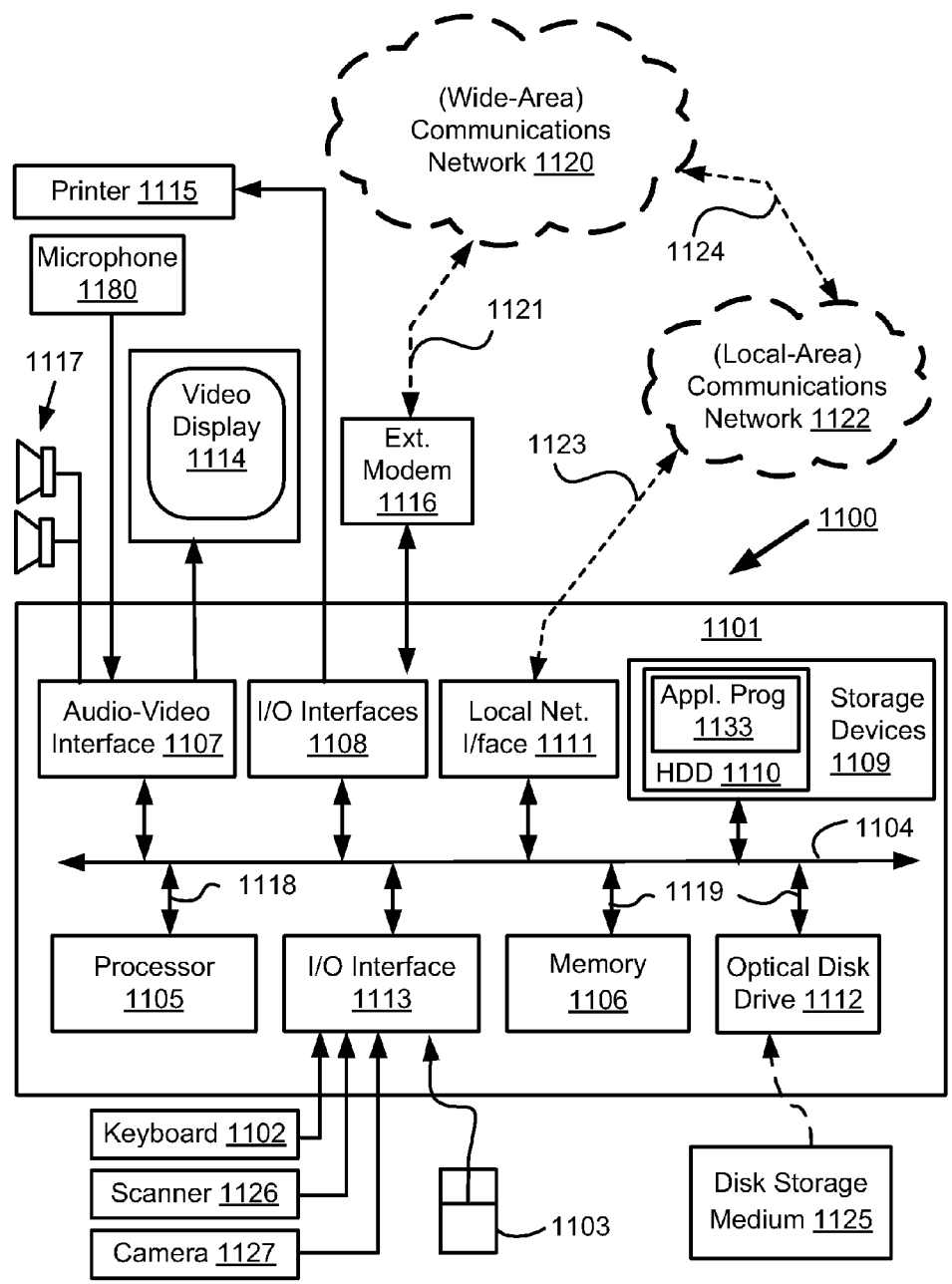
FIGS. 11A and 11B form a schematic block diagram of a general purpose computer system upon which arrangements described can be practised.
Figure 11B:
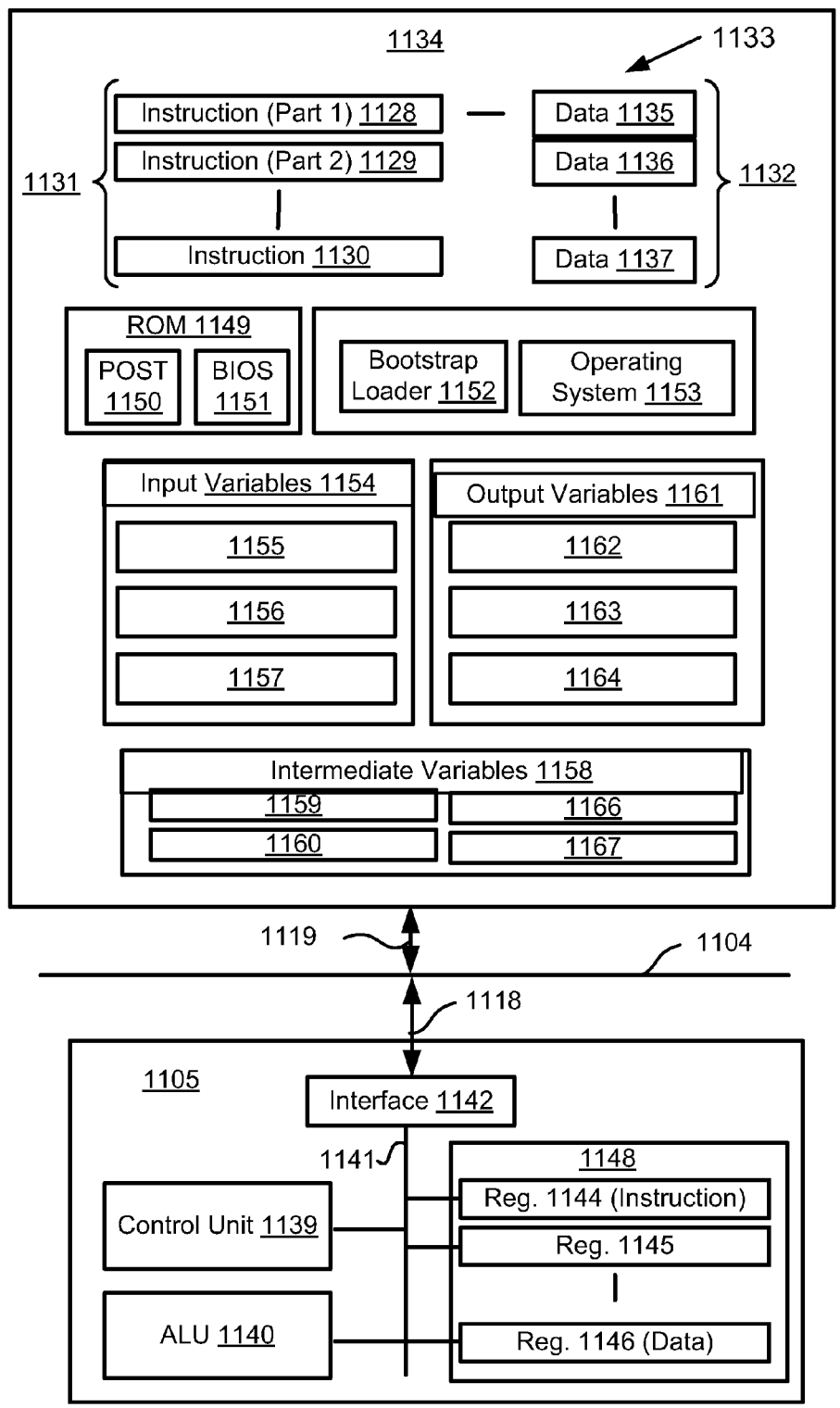

FIGS. 11A and 11B depict a general-purpose computer system 1100, upon which the various arrangements described can be practised.

As seen in FIG. 11A, the computer system 1100 includes: a computer module 1101; input devices such as a keyboard 1102, a mouse pointer device 1103, a scanner 1126, a camera 1127, and a microphone 1180; and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120.

The computer module 1101 typically includes at least one processor unit 1105, and a memory unit 1106. For example, the memory unit 1106 may have semiconductor random access memory (RAM) and semiconductor read only memory (ROM). The computer module 1101 also includes an number of input/output (I/O) interfaces including: an audio-video interface 1107 that couples to the video display 1114, loudspeakers 1117 and microphone 1180; an I/O interface 1113 that couples to the keyboard 1102, mouse 1103, scanner 1126, camera 1127 and optionally a joystick or other human interface device (not illustrated); and an interface 1108 for the external modem 1116 and printer 1115. In some implementations, the modem 1116 may be incorporated within the computer module 1101, for example within the interface 1108. The computer module 1101 also has a local network interface 1111, which permits coupling of the computer system 1100 via a connection 1123 to a local-area communications network 1122, known as a Local Area Network (LAN). As illustrated in FIG. 11A, the local communications network 1122 may also couple to the wide network 1120 via a connection 1124, which would typically include a so-called "firewall" device or device of similar functionality. The local network interface 1111 may comprise an Ethernet™ circuit card, a Bluetooth™ wireless arrangement or an IEEE 802.11 wireless arrangement; however, numerous other types of interfaces may be practised for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1100.

The components 1105 to 1113 of the computer module 1101 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computers on which the described arrangements can be practised include IBM-PCs and compatibles, Sun Sparcstations, Apple Mac™ or alike computer systems.

The methods for performing foreground/background separation on an input image and for detecting foreground in an input image may be implemented using the computer system 1100 wherein the processes of FIGS. 2 to 10, to be described, may be implemented as one or more software application programs 1133 executable within the computer system 1100. In particular, the steps of the method of performing foreground/background separation are effected by instructions 1131 (see FIG. 11B) in the software 1133 that are carried out within the computer system 1100. The software instructions 1131 may be formed as one or more code modules, each for performing one or more particular tasks. The software may also be divided into two separate parts, in which a first part and the corresponding code modules perform the pre-classifying, classifying, and detecting methods and a second part and the corresponding code modules manage a user interface between the first part and the user.

The software 1133 is typically stored in the HDD 1110 or the memory 1106. The software is loaded into the computer system 1100 from a computer readable medium, and executed by the computer system 1100. Thus, for example, the software 1133 may be stored on an optically readable disk storage medium (e.g., CD-ROM) 1125 that is read by the optical disk drive 1112. A computer readable medium having such software or computer program recorded on it is a computer program product. The use of the computer program product in the computer system 1100 preferably effects an apparatus for performing foreground/background separation on an input image, such as for surveillance and security applications.

In some instances, the application programs 1133 may be supplied to the user encoded on one or more CD-ROMs 1125 and read via the corresponding drive 1112, or alternatively may be read by the user from the networks 1120 or 1122. Still further, the software can also be loaded into the computer system 1100 from other computer readable media. Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1101. Examples of transitory or non-tangible computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test (POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 1101 to ensure proper functioning and typically checks the processor 1105, the memory 1134 (1109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 1101 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

As shown in FIG. 11B, the processor 1105 includes a number of functional modules is including a control unit 1139, an arithmetic logic unit (ALU) 1140, and a local or internal memory 1148, sometimes called a cache memory. The cache memory 1148 typically includes a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112, all depicted in FIG. 11A. The execution of a set of the instructions may in some cases result in output of data. Execution may also involve storing data or variables to the memory 1134.

The disclosed foreground detection arrangements use input variables 1154, which are stored in the memory 1134 in corresponding memory locations 1155, 1156, 1157. The foreground detection arrangements produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128, 1129, 1130;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 2 to 10 is associated with one or more segments of the program 1133 and is performed by the register section 1144, 1145, 1147, the ALU 1140, and the control unit 1139 in the processor 1105 working together to perform the fetch, decode, and execute cycles for every instruction in the instruction set for the noted segments of the program 1133.

The method of detecting foreground in an input image may alternatively be implemented in dedicated hardware such as one or more integrated circuits performing the functions or sub functions of pre-classifying, classifying, and detecting. Such dedicated hardware may include graphic processors, digital signal processors, or one or more microprocessors and associated memories.

In one arrangement, foreground/background separation of the visual elements appearing in video frames into foreground objects and background is achieved by comparing captured input visual elements in a scene at a point in time to corresponding visual elements at the same locale, or position, in a scene model. In one arrangement, the scene model includes a set of element models for each visual element, and each element model (also called mode model and mode) is classified as being either foreground or background. In one arrangement, an element model refers to an adaptive representation of a region of the scene, which contains visual as well as temporal information about that region. An element model that is a foreground model may become a background model over time.

The scene model is used to represent visual elements within the scene captured at different points in time. The background element models corresponding to visual elements within the scene model form a representation of the non-transient parts visible in the scene.

Accordingly, the background element models describe a scene containing no foreground objects. The combined set of background element models can be referred to as the background model.

In one arrangement, the scene model is initialised using a predetermined number of initial images in a video sequence. In one particular arrangement, the initial images include one or more initial video frames from a video sequence that is to be processed. In another arrangement, a single test image is utilised as the initial image. The single test image may, for example, be based on a known or expected background.

In one arrangement, a first frame of a video sequence is used as the background model. If the frame contains no foreground objects, that first frame is an accurate background model for the scene, or field of view of the camera, as that first frame is a representation of the non-transient parts visible in the scene. However, using the first frame as the background model is not robust against gradual changes within the scene, or against illumination effects. Also, the assumption that the first frame contains no foreground objects is generally not realistic. Foreground element models within the scene model form a representation of the transient parts of the scene, which correspond to foreground objects that are currently within the scene, or have recently left the scene.

Figure 2:
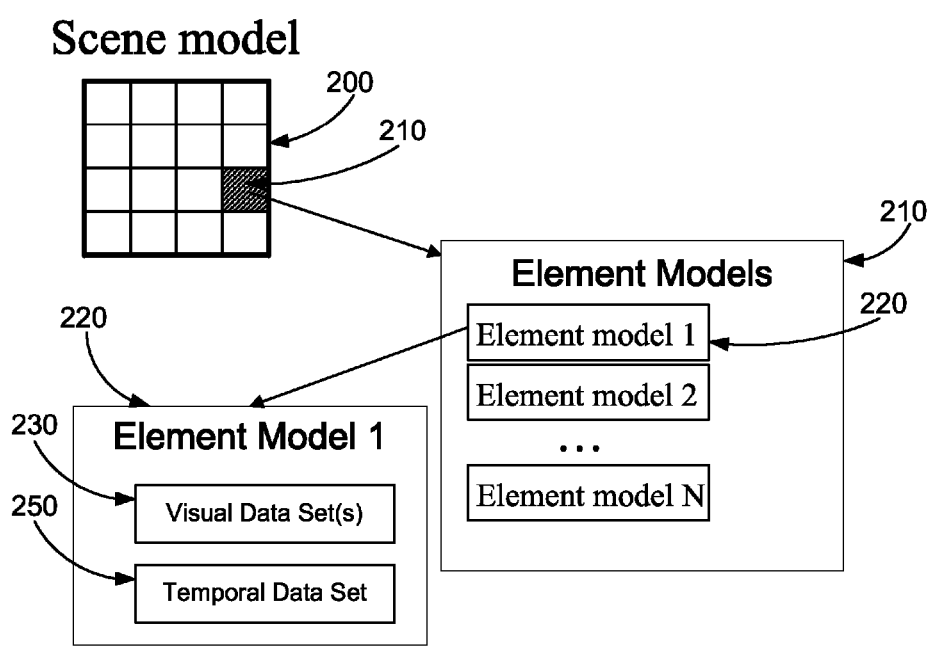
FIG. 2 shows a block diagram of a scene model that includes element models.

FIG. 2 shows a block diagram of a scene model 200 that includes a set of element models. In this example, the scene model 200 includes a group of visual elements presented as an array. The scene model 200 contains a unique element model set associated with each visual element. Each element model set contains one or more element models.

In the example of FIG. 2, the scene model 200 includes a set of element models 210 associated with a visual element in the scene model 200. The set of element models 210 includes at least one element model: Element Model 1, . . . , Element Model N. Element Model 1 220 is a representative element model within the set of element models 210. Element Model 1 220 includes one or more sets of visual data 230 and a temporal data set 250.

A visual data set 230 contains a visual representation of a previously seen visual element. In an exemplary arrangement, a visual representation contains 8 values: the first 6 luminance DCT transform coefficients, the first chrominance blue DCT transform coefficient, and the first chrominance red DCT transform coefficient within an 8 by 8 pixel data block in the YCbCr colour space. In another arrangement, a visual representation contains a different set of transform coefficients, such as Fourier transform coefficients or DWT coefficients. In other arrangements, a visual representation is a group of RGB pixels or a visual representation contains a different set of transform coefficients. Each individual value within a visual representation can be considered a visual characteristic of that visual representation.

The temporal data set 250 includes temporal information relating to the element model 220. In one exemplary arrangement, the temporal information includes a "last match time" corresponding to when the model was last matched to an input visual element, a "creation time" corresponding to when the model was created, a "deletion time" corresponding to when the model is to be deleted, and a "match count" corresponding to how many times the model has matched an input visual element.

Figure 3:
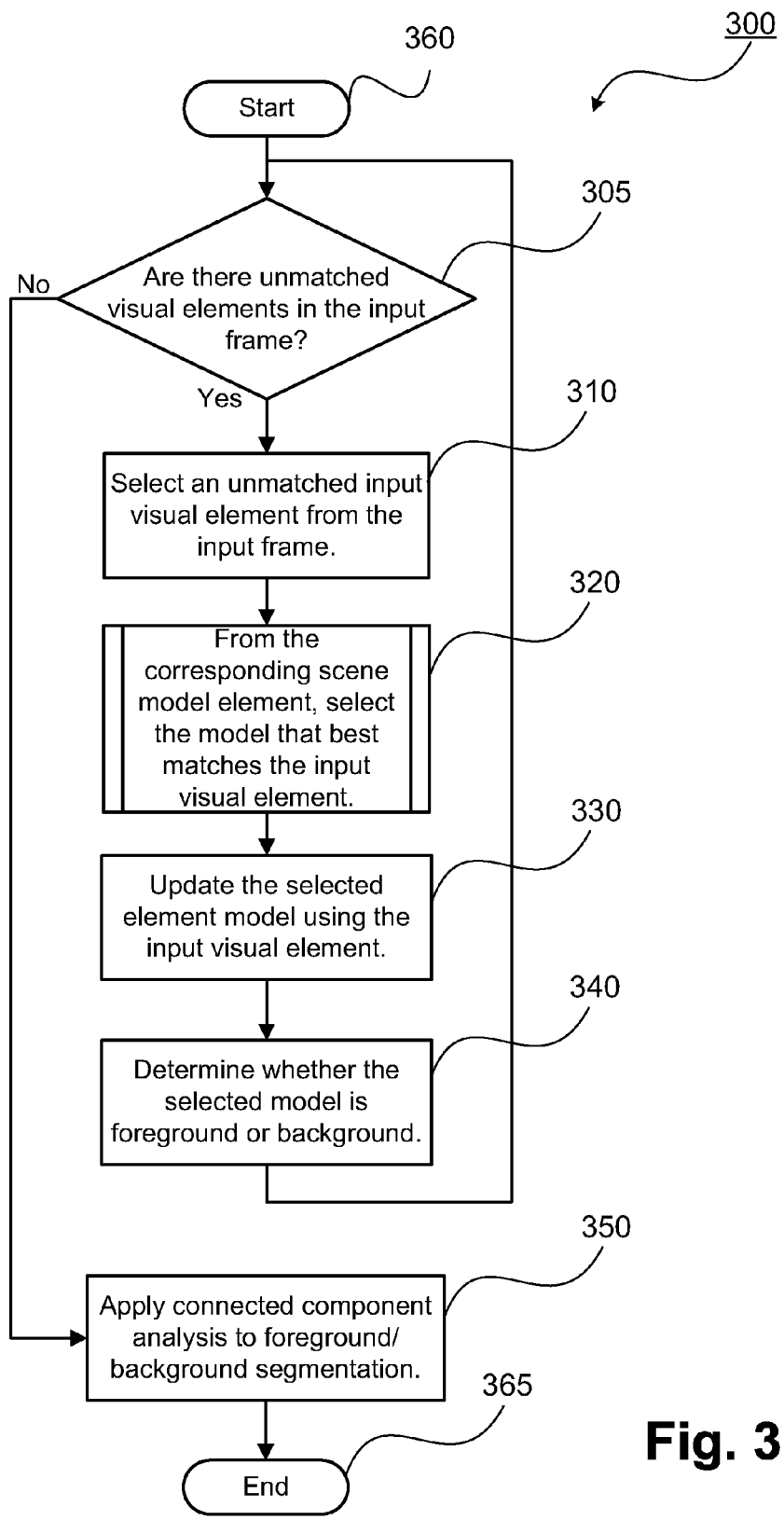
FIG. 3 shows a schematic flow diagram illustrating a method of matching a scene model to an input frame.

FIG. 3 shows a schematic flow diagram illustrating a method 300 of matching a scene model to an input frame. The method 300 begins at a Start step 360, which receives a new input image for processing. The input image includes at least one input visual element. Control passes to a first decision step 305 to check if any of the visual elements in the input frame have not been matched to a corresponding element model in the scene model 200. If all of the visual elements in the input frame have been matched, and consequently there are no unmatched elements, No, then flow passes from decision step 305 to a connected component step 350. Depending on the application, processing of the input image can be restricted to one or more portions of the input image. In such applications, it is not necessary to process every visual element in the input image and only visual elements in the portions, or regions, of interest are processed to assist in the identification of foreground objects.

If at decision step 305 there are visual elements in the input frame that have not been matched to a corresponding element in the scene model 200, Yes, then flow continues on to a selecting step 310, which selects an unmatched visual element from the input frame. After that, a selecting process 320 selects from the corresponding locale in the scene model 200 an element model that best matches the selected unmatched input visual element from the input frame.

Control flows from step 320 to a model update step 330, which updates the element model selected by the process 320. The update step 330 updates the selected element model, including the visual data 230 and the temporal data set 250. The visual data 230 in the selected element model is updated using the input visual element.

In an exemplary arrangement the visual data sets are updated using an approximated median filter, using the equation shown below:

$$m_k^{t+1} = \begin{cases} m_k^t + \min(|m_k^t - i_k|, LR); & \text{if } m_k^t - i_k \geq 0 \\ m_k^t - \min(|m_k^t - i_k|, LR); & \text{otherwise} \end{cases} \quad \text{Eqn (1)}$$

Where $i_k$ is the value of the $k^{th}$ coefficient of the corresponding input element in the input frame, and $m_k^t$ is the current value of the $k^{th}$ coefficient in the visual data set of the selected element model at time t. LR is the learning rate, or the maximum amount of change allowed for a coefficient per frame.

The temporal data set 250 is updated using the current state of the temporal data, and the current time. The creation time of the element model is unchanged. The match count for the element model is incremented, until a maximum match count is reached. The last match time for the element model is set to the current time. The deletion time for the element model is increased. In an exemplary arrangement, the deletion time is updated to be the creation time of the element model, plus a life expectancy. The life expectancy is calculated by multiplying the match count of the model by a scalar, and then adding an offset. In one example, the scalar is 6 and the offset is 32. The actual values may vary widely and will depend upon the particular application and implementation.

Control passes from the update step 330 to a background thresholding step 340, which determines if the chosen element model is a foreground model or background model. In one arrangement, the age of an element model is used for the background thresholding step 340. If the age of the element model is greater than the background threshold, say 120 seconds, then the element model is classified as, or determined to be, a background model; otherwise, the element model is a foreground model. The value of the background threshold may vary widely and depends on the particular application. The age of the element model is the current time minus the creation time of the element model. In one arrangement, the creation frame number (that is, the frame in which the element model was first created) and the current frame number are used to compute the age of the element model. The background threshold is then expressed in frames, say 3600 frames. In one arrangement, the temporal characteristic is "hit count", which is the number of times the element model has been encountered (i.e., matched) in the input image stream. If the hit count is greater than a predefined hit count threshold, say 1800, the element model is considered to be a model of the background, and thus classified as a background model. Otherwise, the element model is considered to be a foreground model. In one arrangement, both age and hit count are used: the element model is background if age exceeds the background threshold and hit count exceeds the hit count threshold.

Control passes from step 340 and returns to the decision step 305. If at decision step 305 all input visual elements have been processed and there are no unmatched visual elements, No, then the control flow follows the NO arrow to the connected component analysis step 350. The connected component analysis step 350 combines neighbouring matched foreground element models into "blobs", and creates temporal statistics for each foreground blob, based on the temporal data sets of the foreground models within the blob. Control passes from step 350 to an End step 365 and the method 300 terminates.

Figure 4:
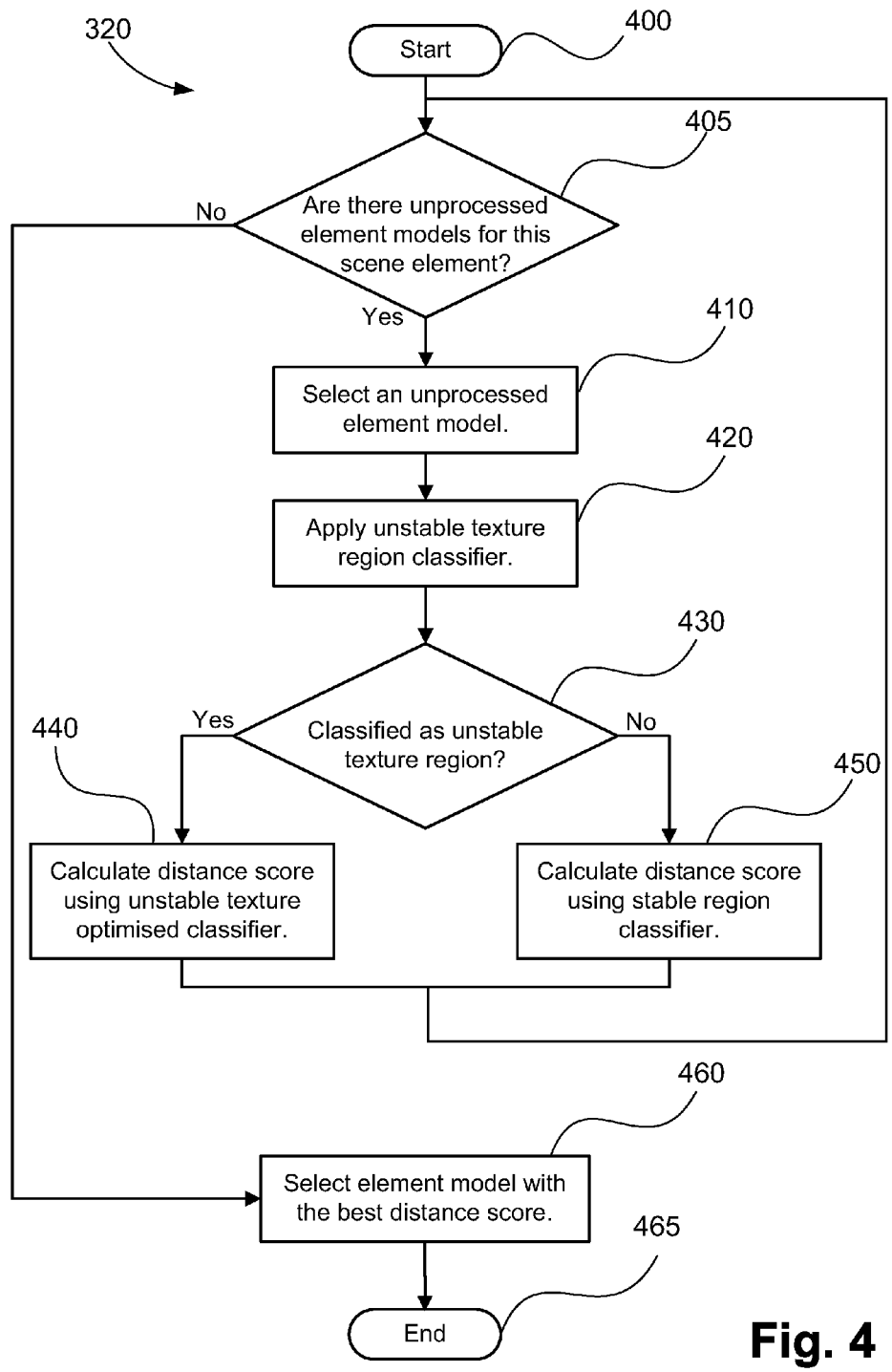
FIG. 4 shows a schematic flow diagram illustrating a method of selecting an element model that matches an input visual element as used in the method of FIG. 3, including a classification step to classify the input visual element as either an unstable texture region or a stable region.

FIG. 4 further elaborates on the process 320 of FIG. 3. FIG. 4 shows a schematic flow diagram illustrating the method 320 of selecting an element model that matches an input visual element. The process 320 starts at a Start step 400 and proceeds to a first decision step 405 to check if all element models in a set of element models associated with the input visual element that is presently being processed have been compared to that input visual element. If all of the element models have been compared to the input visual element, and thus there are no unprocessed element models remaining for that visual element, No, then control flow passes to a select best element model step 460.

If at first decision step 405 there are remaining element models to be compared, Yes, then flow continues on to a next step 410 that selects an unprocessed element model. Control then passes to step 420, which applies an unstable texture region classifier that attempts to determine whether the input visual element is an unstable texture region or a stable region.

The unstable texture region classifier in step 420 uses information in the input visual element and element model to determine if the input visual element contains unstable textures, such as swaying leaves and branches in trees or rippling water. The unstable texture region classifier in step 420 is a "pre-classification" step, to determine which classifier should then be applied to best match the element model to the input visual element. Applying different classifiers based on the pre-classification step improves the result of foreground/background separation.

Using visual element based classification, as opposed to blob-based classification, provides higher granularity when compared to some known methods. A localised decision at the visual element level, as opposed to a post-processing decision at the blob level, reduces the effect of an incorrect classification and allows for more detailed classifications and more accurate detections in complex scenarios. For example, a post-processing step in a scenario where a detected foreground blob (such as a human) merges with a foreground blob created due to unstable textures cannot filter out the unstable texture part of the merged blob. Additionally, the post-processing step in this example has a risk of incorrectly removing the merged blob entirely, thus losing the detected object.

Misdetections, inconsistent sizes of detections, and inconsistent temporal statistics for detections can cause problems for higher-level processing, such as tracking and rule-based processing. By attempting to classify unstable textures at a visual element level, the risk of a misclassification is reduced to the visual element granularity, which lessens the impact of misdetections when performing further processing on detected foreground blobs.

The unstable texture region classifier in step 420 classifies the input visual element as either an unstable texture region or a stable region. An unstable texture region has an input visual element formed by texture data that has a similar aggregate brightness and similar aggregate colour when compared to a corresponding element model, and a different texture when compared to the same element model.

In one implementation, the aggregate brightness is the first luminance (Y0) DCT coefficient in the block (the luma DC coefficient), and the aggregate colour is the first chrominance blue (Cb0) DCT coefficient in the block (the chroma blue DC coefficient) and the first chrominance red (Cr0) DCT coefficient in the block (the chroma red DC coefficient).

The texture is represented by the luminance and chrominance AC coefficients in the block. In an exemplary arrangement, the AC coefficients used are the upper-left five luminance AC coefficients (Y1 to Y5 inclusive). In another arrangement, the AC coefficients used are the upper-left fourteen luminance AC coefficients (Y1 to Y14 inclusive) and the upper-left two chrominance AC coefficients (Cb1, Cb2, Cr2, and Cr2).

A first visual distance score is calculated for the aggregate brightness and aggregate colour match ($VD_{DC}$) between the input visual element and the element model. A second visual distance score is calculated for the texture match ($VD_{AC}$) between the input visual element and the element model.

In one arrangement, the $VD_{DC}$ and the $VD_{AC}$ are a sum of the absolute differences between the corresponding coefficients in the element model and the coefficients in the input visual element.

In another arrangement, the $VD_{Dc}$ and the $VD_{AC}$ are a weighted sum of the absolute differences between the corresponding coefficients in the element model and the coefficients in the input visual element.

The equation for the $VD_{DC}$ using a weighted sum is shown below:

$$VD_{DC}=(w_{Y0}*|m_{y0}-i_{Y0}|)+(w_{Cb0}*|m_{Cb0}-i_{Cb0}|)+ (w_{Cr0}*|m_{Cr}-i_{Cr0}|) \qquad \text{Eqn (2)}$$

Where w is the weight for each coefficient, m is the value of the coefficient in element model, and i is the value of the coefficient in the input visual element.

The equation for the $VD_{AC}$ using a weighted sum is shown below:

$$VD_{AC} = \sum_{f=1}^{5} (w_f * |m_{Yf} - i_{Yf}|) \qquad \text{Eqn (3)}$$

The weight w for each coefficient used by the unstable texture region classifier 420 is chosen based on machine learning from sample data.

The unstable texture region classifier 420 can now compare the $VD_{DC}$ and the $VD_{AC}$.

Figure 5:
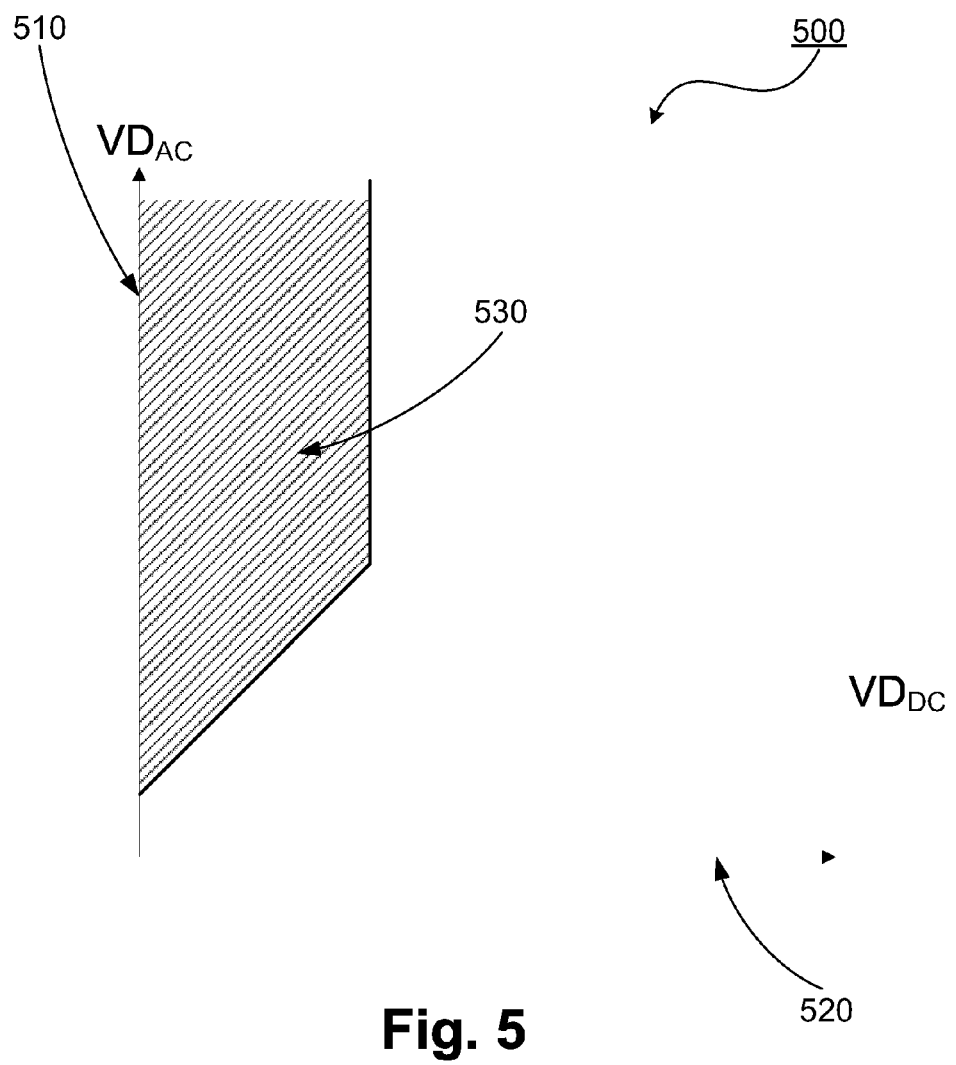
FIG. 5 is a plot showing how an unstable texture region classifier, in one arrangement, classifies the input visual element as either an unstable texture region or a stable region.

FIG. 5 is a graph 500 that shows how the unstable texture region classifier of step 420 compares the $VD_{DC}$ and the $VD_{AC}$ in one arrangement to classify the input visual element as either an unstable texture region or a stable region. A vertical axis 510 in the graph 500 represents the $VD_{AC}$ and a horizontal axis 520 in the graph 500 represents the $VD_{DC}$. If the $VD_{DC}$ and the $VD_{AC}$ for an input visual element and an element model fall is within a cross-hatched area 530, then the potential match between the element model and the input visual element is treated as if it is an unstable texture region. If the $VD_{DC}$ and the $VD_{AC}$ for an input visual element and an element model fall outside of the cross-hatched area 530, then the potential match between the element model and the input visual element is treated as if it is a stable region.

In one arrangement, the unstable texture region classifier of step 420 includes a temporal element based on classifications by the unstable texture region classifier of step 420 in previous input frames. The temporal element is stored in the temporal data set 250 for an element model.

In one arrangement, the temporal element is a counter that is increased when the input visual element is classified as an unstable texture region based on the above method using the $VD_{DC}$ and $VD_{AC}$, and decreased when the input visual element is not classified as an unstable texture region based on the above method using the $VD_{DC}$ and $VD_{AC}$. The counter is limited to a maximum value and a minimum value. If the counter is above or equal to a threshold, then the region is classified as an unstable texture region for further processing in this frame. If the counter is below the threshold, then the region is not classified as an unstable texture region for further processing in this frame.

In one arrangement, the temporal element is a sliding window of classifications in the previous N input frames. If a predefined number X classifications out of a predefined number N of last classifications for the input visual element have been classified as unstable texture regions based on the above method using the $VD_{DC}$ and $VD_{AC}$, then the input visual element is classified as an unstable texture region for further processing in this frame. Otherwise, the region is not classified as an unstable texture region for further processing in this frame. In one example, the predefined number X of classifications is 5 and the predefined number N of last previous classifications is 8. This provides a sliding window of the preceding 8 frames.

Returning to FIG. 4, control passes from the unstable texture region classifier step 420, to a decision step 430 that checks whether the input visual element has been classified as an unstable texture region. If the input visual element has been classified as an unstable texture region, Yes, then the flow follows the "Yes" arrow to step 440, which applies an unstable texture region optimised classifier to calculate a visual distance score.

The unstable texture region optimised classifier applied in step 440 calculates the visual distance score using a weighted sum of the absolute differences between the aggregate brightness and aggregate colour coefficients in the element model and the aggregate brightness and aggregate colour coefficients in the input visual element.

The equation for the visual distance score ($VD_{FINAL}$) calculated by the unstable texture region optimised classifier 440 is shown below:

$$VD_{FINAL}=(w_{Y0}*|m_{Y0}-i_{Y0}|)+(w_{Cb0}*|i_{Cb0}|)+ (w_{Cr0}*|m_{Cr}-i_{Cb0}|) \qquad \text{Eqn (4)}$$

Where w is the weight for each coefficient, m is the value of the coefficient in element model, and i is the value of the coefficient in the input visual element.

In one arrangement, the corresponding coefficient weights used by the unstable texture region optimised classifier in step 440 to calculate the $VD_{FINAL}$ are different from the corresponding coefficient weights used to calculate the $VD_{DC}$ by the unstable texture region classifier in step 420.

In another arrangement, the corresponding coefficient weights used by the unstable texture region optimised classifier in step 440 and the unstable texture region classifier in step 420 are the same.

After applying the unstable texture region optimised classifier in step 440, the flow returns to the first decision step 405.

Returning to the decision step 430, if the input visual element has been classified as a stable region and is thus not an unstable texture region, No, then the flow follows the "No" arrow to a step 450, which applies a stable region classifier to calculate the visual distance score.

The stable region classifier in 450 calculates a visual distance score ($VD_{FINAL}$) using a weighted sum of the absolute difference between each coefficient value in the input visual element and the visual set, as shown by the following equation:

$$VD_{FINAL} = \sum_{f=0}^{n} (w_f * |m_{Yf} - i_{Yf}|) \qquad \text{Eqn (5)}$$

Where n is the number of coefficients used to model the visual element, w is the weight for each coefficient, m is the value of the coefficient in element model, and i is the value of the coefficient in the input visual element.

In one arrangement, the corresponding coefficient weights used by the stable region classifier in step 450 to calculate the $VD_{FINAL}$ are different from the corresponding coefficient weights used to calculate the $VD_{DC}$ and the $VD_{AC}$ by the unstable texture region classifier in step 420.

In another arrangement, the corresponding coefficient weights used by the stable region classifier in step 450 and the unstable texture region classifier in step 420 are the same.

In another arrangement, the corresponding coefficient weights used by the stable region classifier in step 450 to calculate the $VD_{FINAL}$ are different from the corresponding coefficient weights used to calculate the $VD_{FINAL}$ by the unstable texture region optimised classifier in step 440. In this arrangement, the weights used by the stable region classifier in step 450 and the unstable texture region optimised classifier in step 440 differ such that the $VD_{FINAL}$ produced by the stable region classifier in step 450 can be directly compared to the $VD_{FINAL}$ produced by the unstable texture region optimised classifier in step 440 without having to scale either $VD_{FINAL}$ value.

After applying the stable region classifier in step 450, control flow returns to the first decision step 405. If there are no remaining unprocessed element models, "No", then the flow takes the "No" arrow to step 460 that selects the element model with the best $VD_{FINAL}$. If no element model has a $VD_{FINAL}$ better than a predefined sensitivity level, then a new element model is created to model the input visual element. The match to an existing element model, or the match to a newly created element model, is a visual classification step.

The sensitivity level controls how easily new element models are created. A high sensitivity level results in fewer new element models being created, and therefore more matches to existing element models. With a higher sensitivity level, there will be more matches to background models as fewer foreground models will be created, and thus the output will contain fewer matched foreground models.

A low sensitivity level causes more new element models being created, and therefore fewer matches to existing models. As new element models are initially foreground models, with a low sensitivity level the output will contain more matched foreground models and more newly created, foreground models.

Control passes from step 460 to an End step 465 and step 320 terminates. Control then passes to step 330 of FIG. 3, as described above.

Figure 6:
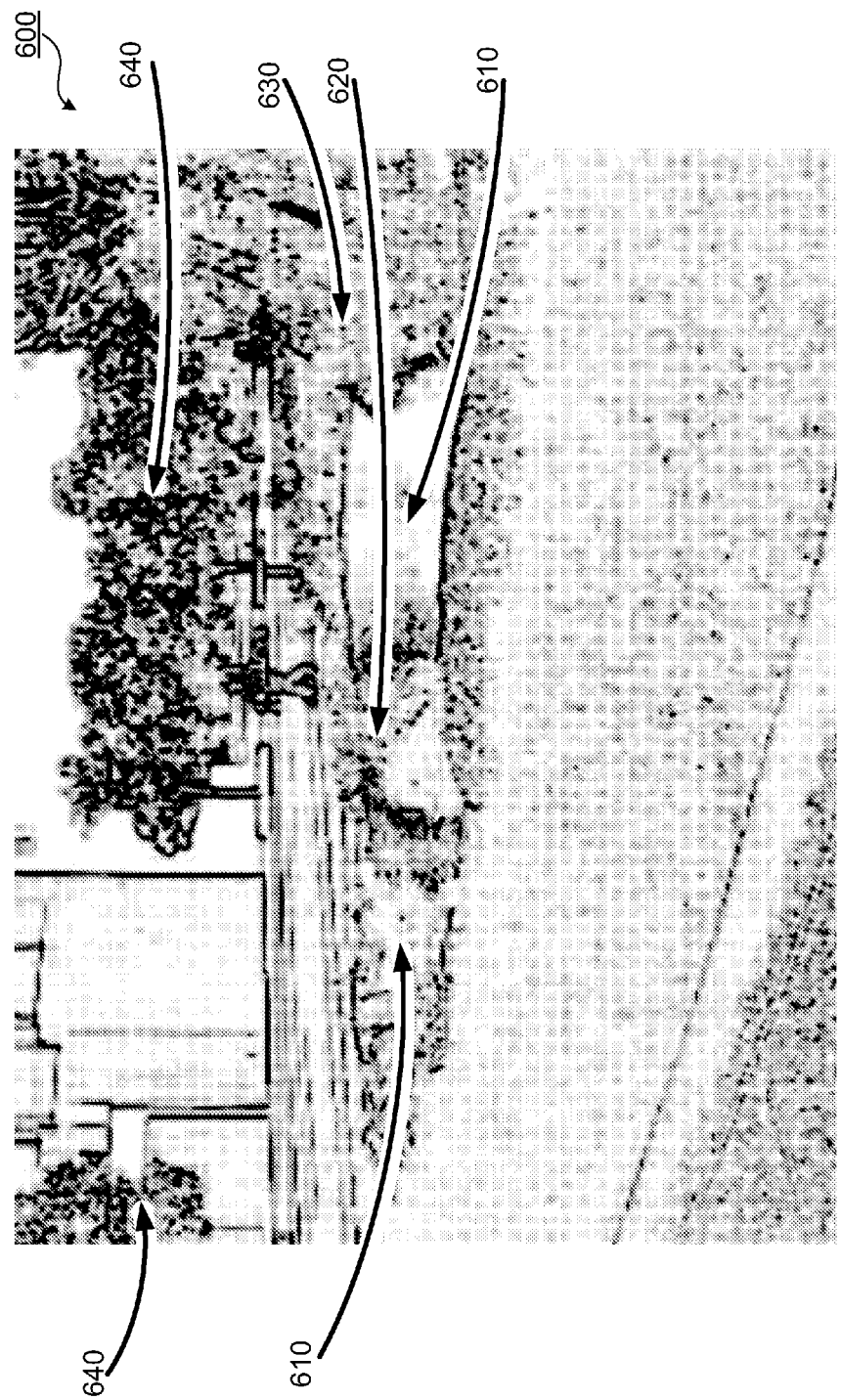
FIG. 6 is an edge-map of a scene with foreground objects and dynamic background.

FIG. 6 is an edge-map of a scene 600 featuring foreground objects and one or more regions of dynamic background. It is to be noted that the edge-map is derived from an input image. The edge-map of FIG. 6 may suffer if this patent application is reproduced through printing, scanning, or photocopying. The scene 600 includes a pond 610 split by some bushes 620, with further bushes 630 on the right-hand side, and trees 640 in the back of the scene. The pond 610, bushes 620, 630, and trees 640 are examples of unstable texture when affected by wind, resulting in motion in the background elements.

Figure 7:
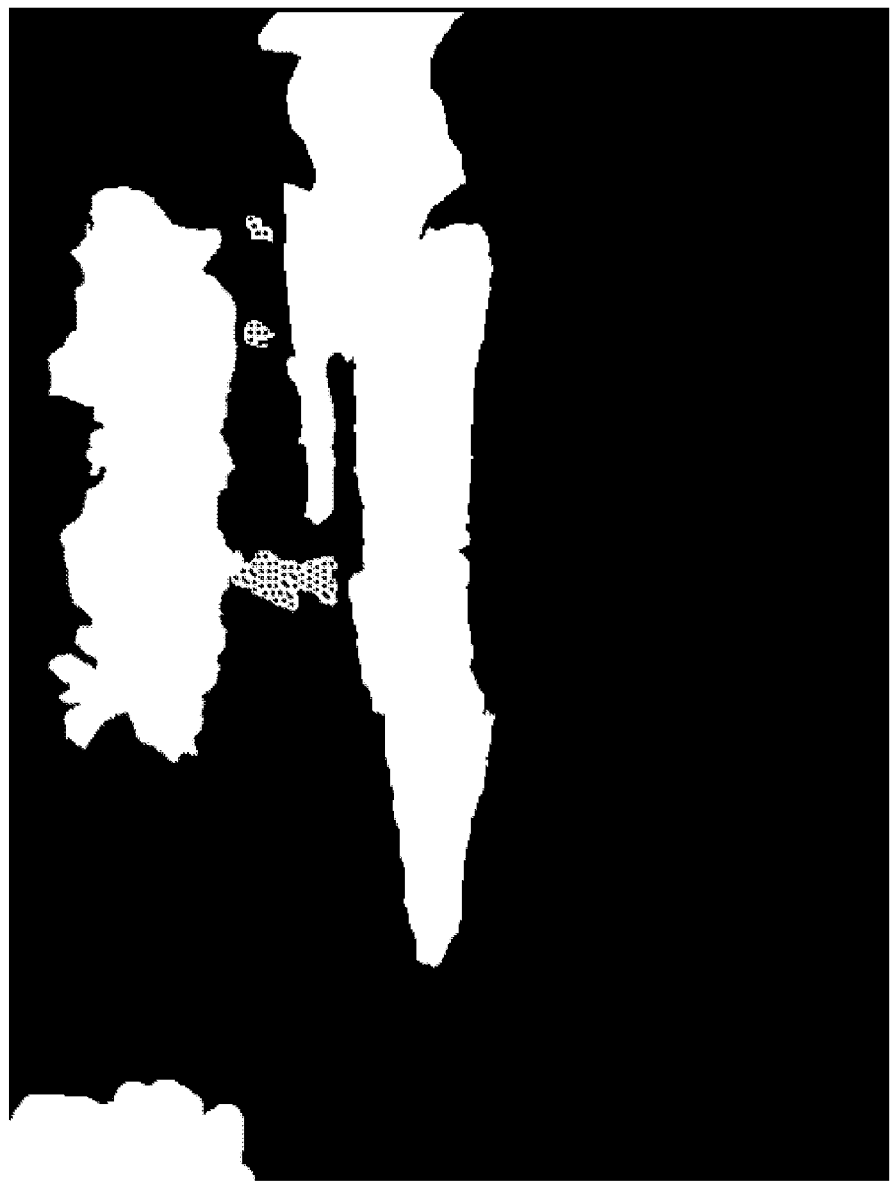
FIG. 7 shows the same scene as illustrated in FIG. 6, but with the unstable texture areas annotated by the white areas and the foreground objects annotated by the white areas with black dots.

FIG. 7 shows the same scene as illustrated in the edge-map of FIG. 6, but with areas of unstable texture annotated as the white areas and foreground areas annotated as the white areas with black dots. In this example, the areas of unstable texture correspond to the pond 610, bushes 620, 630 and trees 640. The foreground areas are humans walking near the back of the scene.

Figure 8:
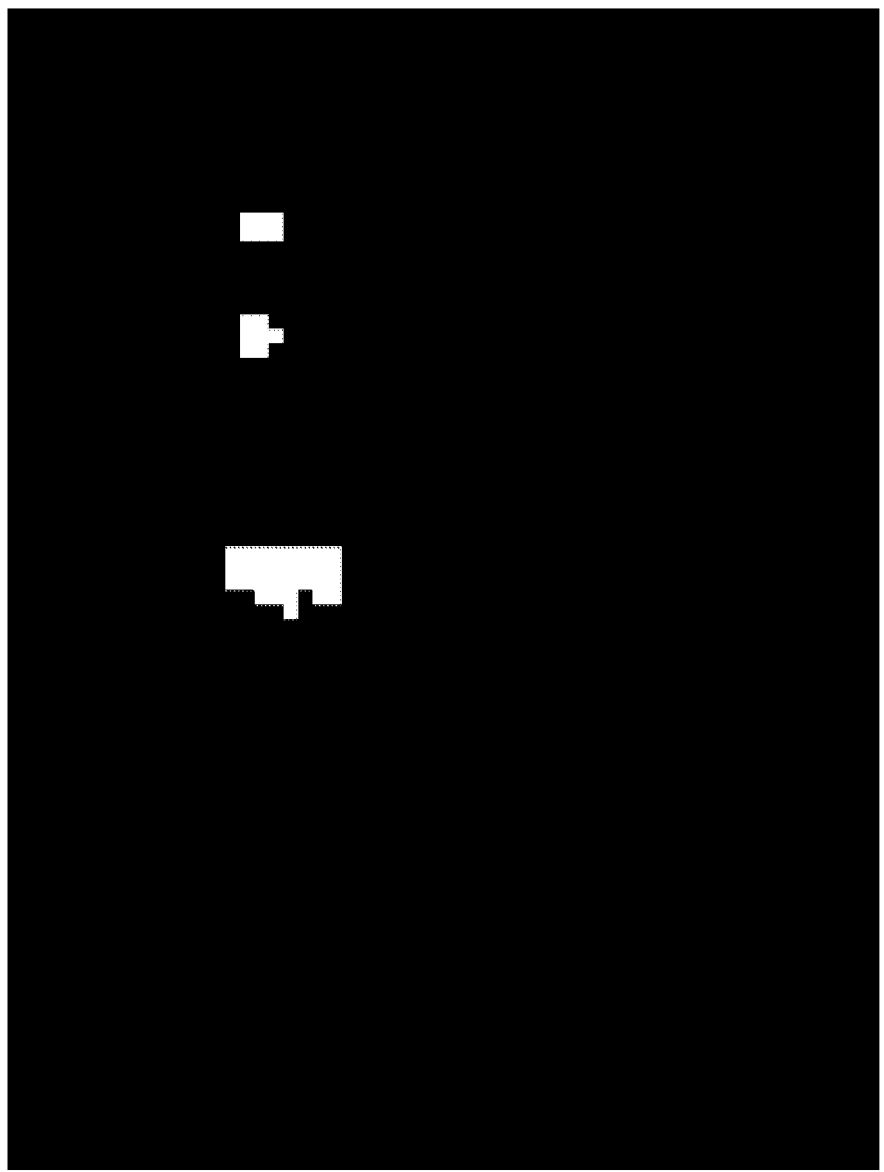
FIG. 8 shows the detected foreground of the scene shown in FIG. 6.

FIG. 8 shows the detected foreground in the same scene as illustrated in the edge-map of FIG. 6. The detected foreground in the scene is shown by the white areas. The black areas are background. No foreground is incorrectly detected in the unstable texture areas.

Figure 9:
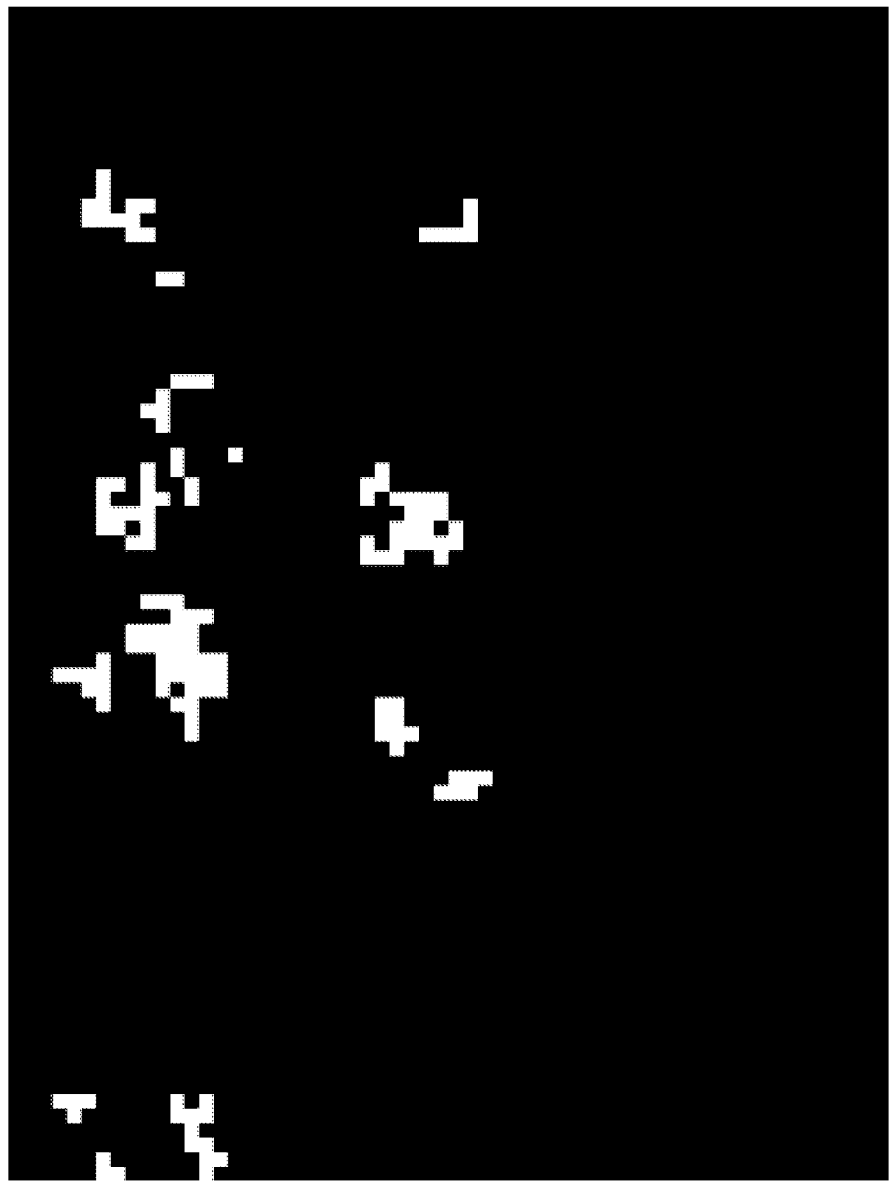
FIG. 9 shows detected areas which have been classified as unstable texture regions in the scene shown in FIG. 6.

FIG. 9 shows the areas that have been classified as unstable texture regions in the same scene as illustrated in the edge-map of FIG. 6. The areas classified as unstable texture regions are shown in white. The areas classified as stable regions are shown in black. Due to the white areas being detected as unstable texture regions, those areas are correctly detected as background, as shown in FIG. 8.

Figure 10:
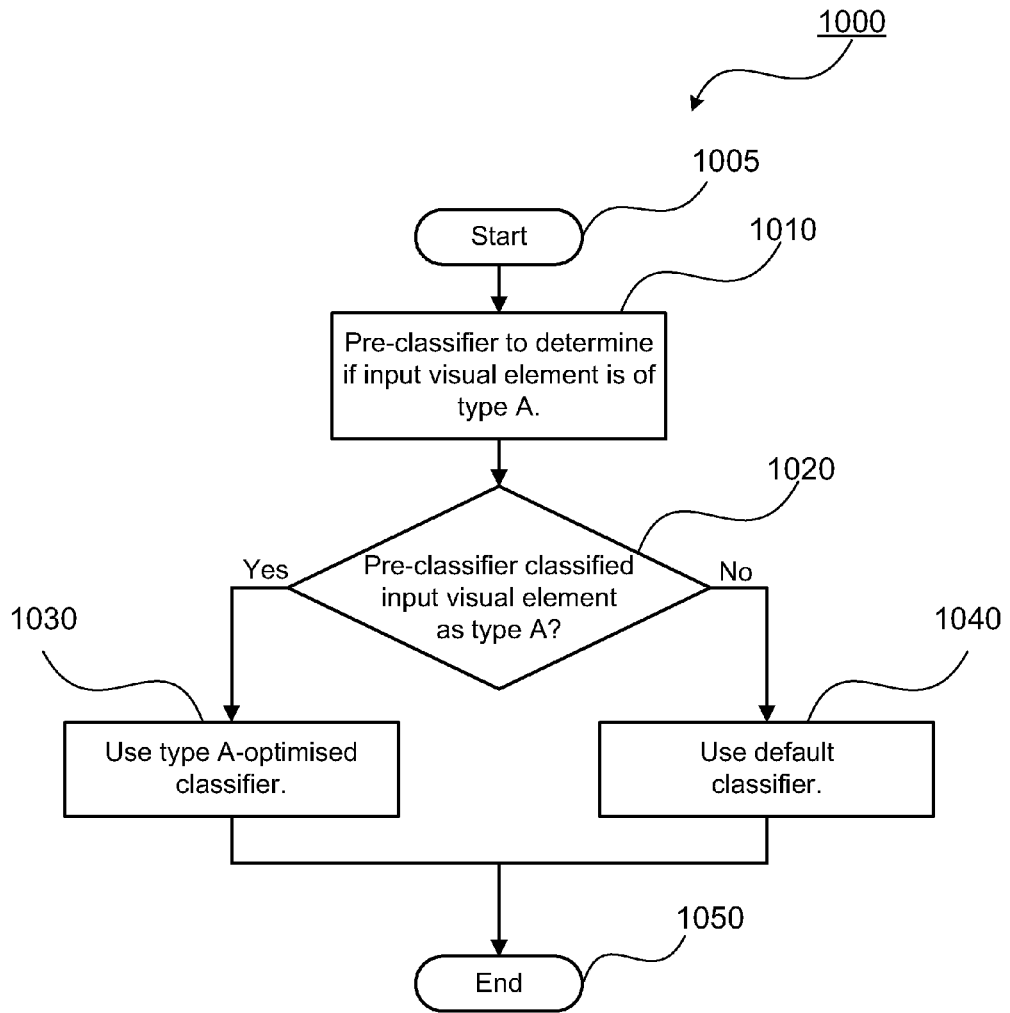
FIG. 10 shows a schematic flow diagram illustrating a process that utilises a pre-classification step.

FIG. 10 is a schematic flow diagram illustrating a process 1000 that utilises a pre-classification step to increase the accuracy of classification in foreground/background separation during video image processing. By using a pre-classification step to determine if an input visual element is of a certain type, or showing a certain behaviour, a subsequent decision step can determine which final classifier to use to increase the likelihood of making the correct detection. If the pre-classification step detects that the input visual element requires special classification, then a differently configured classification step is used. If the pre-classification step detects that the input visual element requires normal or typical classification, then the default classifier is used.

The process 1000 begins at a Start step 1005 and proceeds to a pre-classification step 1010. The pre-classification step 1010 utilises a pre-classifier to determine if an input visual element matches a predefined type or classification. The result of the pre-classification step 1010 is passed to a decision step 1020, which determines whether the pre-classifier classified input visual element is of the predefined type or classification. If the pre-classifier classified input visual element matches the predefined type, Yes, control passes from step 1020 to step 1030, which applies a first type of classifier that is optimised to operate on visual elements of the predefined type. Control passes from step 1030 to an End step 1050 and the process 1000 terminates.

Returning to step 1020, if the pre-classifier classified input visual element does not match the predefined type, No, control passes from step 1020 to step 1040, which applies a second, or default, type of classifier. The second type of classifier is preferably configured or optimised to operated on normal, or typical, visual elements. Control passes from step 1040 to an End step 1050 and the process 1000 terminates.

In another arrangement, the unstable texture region classifier of step 420 of FIG. 4 is only applied to the element model with the best $VD_{DC}$ match. In other words, the input visual element is compared to the element model with a $VD_{DC}$ that satisfies a predetermined criterion. The element model with the best $VD_{DC}$ will use the unstable texture region optimised classifier 440 if the unstable texture region classifier 420 has classified the input visual element as an unstable texture region. The element model with the best $VD_{DC}$ will use the stable region classifier 450 if the unstable texture region classifier 420 has not classified the input visual element as an unstable texture region. The remaining element models will use the stable region classifier.

Embodiments of the present disclosure enable more accurate foreground/background separation for a scene containing dynamic elements, such as swaying branches and rippling water. Embodiments of the present disclosure achieve a more accurate result by attempting to classify the behaviour of the input, in a "pre-classification" step, prior to foreground/background classification. By applying a pre-classification step to the input prior to performing foreground/background classification, the granularity is higher when compared to post-processing methods, resulting in several benefits:

- the ability to produce accurate detections in complex scenarios, such as when a foreground region intersects an unstable texture region;
- a lower impact on the quality of the output when making an incorrect classification at the pre-classification step, as a an incorrect decision in a post-processing step could either remove a real detection, or fail to remove a false detection; and
- the ability to use localised heuristics based on visual and temporal data to make a classification, as opposed to using gross detection-wide heuristics.

INDUSTRIAL APPLICABILITY

The arrangements described are applicable to the computer and data processing industries and particularly for the video, imaging, and security industries.

The foregoing describes only some embodiments of the present invention, and modifications and/or changes can be made thereto without departing from the scope and spirit of the invention, the embodiments being illustrative and not restrictive.

We claim:

1. A computer-implemented method for performing foreground/background separation on an input image, said method comprising the steps of:
    pre-classifying a plurality of input visual elements in said input image as at least one of a first element type and a second element type, said at least one first element type having unstable texture characteristics and said second element type having stable texture characteristics, dependent upon a predetermined characteristic;
    performing a first foreground/background separation on said at least one input visual element pre-classified as the first element type, said first foreground/background separation being based on at least one of colour data and brightness data of said input visual element without texture data of said input visual element; and
    performing a second foreground/background separation on said at least one input visual element pre-classified as the second element type, said second foreground/background separation being based on texture of said input visual element and at least one of colour data and brightness data of said input visual element.

2. The method according to claim 1, wherein:
    (a) the input visual element having a first characteristic relating to an average of colour data and brightness data of the input visual element satisfying a first threshold is pre-classified as the first element type; and
    (b) the input visual element having a second characteristic relating to texture of image data in the input visual element satisfying a second threshold is pre-classified as the second element type.

3. The method according to claim 1, wherein colour data and brightness data corresponds to the DC components of the input visual element.

4. The method according to claim 1, wherein the texture data corresponds to the AC components of the input visual element.

5. The method according to claim 1, wherein an input visual element is identified as the unstable texture region when a counter associated with the input visual element satisfies a third predetermined threshold.

6. The method according to claim 1, wherein the predetermined characteristics is a first visual distance of texture data between an input visual element and a corresponding local element model which is stored information relating to a scene and a second visual distance of at least one of colour data and brightness data between the input visual element and the corresponding local element model which is stored information relating to the scene.

7. The method according to claim 6, wherein each of the first visual distance and the second visual distance is a weighted sum of differences between a coefficient value in the input visual element and a corresponding coefficient of the element model.

8. The method according to claim 7, wherein a weight for the weighted sum used to calculate the visual distance for the input visual element pre-classified as the first element type is different from a corresponding weight for the weighted sum used to calculate the visual distance for the input visual element pre-classified as the second element type.

9. A computer-implemented method for detecting foreground in an input image, said method comprising the steps of:
    pre-classifying a plurality of input visual elements in said input image as at least one of a first element type and a second element type, said at least one first element type having unstable texture characteristic and said second element type having stable texture characteristics, dependent upon a predetermined characteristic;
    classifying at least one said pre-classified input visual element by applying a first classifier if said one pre-classified input visual element is of the first element type and applying a second classifier if said one pre-classified input visual element is of the second element type, the classifiers operating based on texture of said one pre-classified input visual element and at least one of colour data and brightness data of said one pre-classified input visual element; and
    detecting said input visual element as foreground dependent upon said classifying step.

10. The method according to claim 9, wherein said first element type corresponds to an unstable textured visual element and said second element type corresponds to a stable textured visual element.

11. The method according to claim 9, wherein said first classifier is configured for said predetermined characteristic and said first and second classifiers are different.

12. The method according to claim 11, wherein said predetermined characteristic is unstable texture, said first classifier is configured for unstable textured visual elements, and said second classifier is configured for stable textured visual elements.

13. A non-transitory tangible computer readable storage medium having a computer program recorded thereon, the program being executable by computer apparatus to detect foreground in an input image, said computer program comprising:
    code for pre-classifying a plurality of input visual elements in said input image as at least one of a first element type and a second element type, said at least one first element type having unstable texture characteristics and said second element type having stable texture characteristics, dependent upon a predetermined characteristic;
    code for classifying at least one said pre-classified input visual element by applying a first classifier if said one pre-classified input visual element is of the first element type and applying a second classifier if said one pre-classified input visual element is of the second element type, the classifiers operating based on texture of said one pre-classified input visual element and at least one of colour data and brightness data of said one pre-classified input visual element; and code for detecting said input visual element as foreground dependent upon said classifying step.

14. Apparatus for detecting foreground in an input image, said apparatus comprising:

a memory storage device storing a computer program; and a processor for executing the computer program, said program comprising code executable by the processor for:

pre-classifying a plurality of input visual elements in said input image as at least one of a first element type and a second element type, said at least one first element type having unstable texture characteristics and said second element type having stable texture characteristics, dependent upon a predetermined characteristic;

classifying at least one said pre-classified input visual element by applying a first classifier if said one pre-classified input visual element is of the first element type and applying a second classifier if said one pre-classified input visual element is of the second element type, the classifiers being based on texture of said one pre-classified input visual element and at least one of colour data and brightness data of said one pre-classified input visual element; and detecting said input visual element as foreground dependent upon said classifying step.

15. The apparatus according to claim 14, wherein said storage device and processor are components of one of a camera and a general purpose computer.

16. A non-transitory tangible computer-readable storage medium having recorded thereon a program, the program being executable by computerised apparatus to perform foreground/background separation on an input image, said program comprising:

code for pre-classifying a plurality of input visual elements in said input image as at least one of a first element type and a second element type, said at least one first element type having unstable texture characteristics and said second element type having stable texture characteristics, dependent upon a predetermined characteristic;

code for performing a first foreground/background separation on said at least one input visual element pre-classified as the first element type, said first foreground/background separation being based on at least one of colour data and brightness data of said input visual element without texture data of said input visual element without texture data of said input visual element; and code for performing a second foreground/background separation on said at least one input visual element pre-classified as the second element type, said second foreground/background separation being based on texture of said input visual element and at least one of colour data and brightness data of said input visual element.

17. Computerised apparatus for performing foreground/background separation on an input image, said apparatus comprising:

a processor; and a memory coupled to the processor and having a program recorded therein, the program being executable by the processor to perform the foreground/background separation and comprising:

code for pre-classifying a plurality of input visual elements in said input image as at least one of a first element type and a second element type, said at least one first element type having unstable texture characteristics and said second element type having stable texture characteristics, dependent upon a predetermined characteristic;

code for performing a first foreground/background separation on said at least one input visual element pre-classified as the first element type, said first foreground/background separation being based on at least one of colour data and brightness data of said input visual element without texture data of said input visual element; and code for performing a second foreground/background separation on said at least one input visual element pre-classified as the second element type, said second foreground/background separation being based on texture of said input visual element and at least one of colour data and brightness data of said input visual element.

\* \* \* \* \*